United States Patent [19]

Chang

[11] Patent Number: 4,989,108
[45] Date of Patent: Jan. 29, 1991

[54] ELECTRO-MECHANICAL LATCH
[75] Inventor: David Chang, Encino, Calif.
[73] Assignee: Micropolis Corporation, Chatsworth, Calif.
[21] Appl. No.: 416,663
[22] Filed: Oct. 3, 1989
[51] Int. Cl.[5] .......................... G11B 5/54; G11B 21/22
[52] U.S. Cl. .................................................... 360/105
[58] Field of Search ...................... 360/105, 106, 97.01
[56] References Cited

U.S. PATENT DOCUMENTS

| 4,706,142 | 11/1987 | Hattori et al. | 360/106 X |
| 4,807,072 | 2/1989 | Ono et al. | 360/105 |
| 4,816,942 | 3/1989 | Tanishima et al. | 360/105 X |
| 4,866,554 | 9/1989 | Stupeck et al. | 360/105 |
| 4,881,139 | 11/1989 | Hazebrouck | 360/97.01 X |
| 4,890,176 | 12/1989 | Casey et al. | 360/105 |

Primary Examiner—John H. Wolff
Attorney, Agent, or Firm—Poms, Smith, Lande & Rose

[57] ABSTRACT

An electro-mechanical latch includes a solenoid having an armature movable from a normally biased first position to a second position in response to an electrical current applied to the solenoid, and means for holding the armature in the second position to allow subsequent removal of the current from the solenoid. When the armature is in its first position, it is adapted to latch a device in a parked position. The armature is non-interactive with said device in its second position. The electro-mechanical latch of the present invention further includes means for releasing the holding of the armature in response to the device returning to its parked position whereby the armature returns to its normally biased first position to latch the device. An important advantage of the present invention is that the current need be applied to the solenoid only for moving the armature to release the device. The current may then be removed since the armature will be held in a position which is non-interactive with the device.

30 Claims, 3 Drawing Sheets

ELECTRO-MECHANICAL LATCH

FIELD OF INVENTION

The present invention relates generally to electro-mechanical devices and more particularly to a novel electro-mechanical latch.

BACKGROUND OF INVENTION

In a Winchester-type disk drive, an actuator is rotatably mounted to the chassis of the disk drive which carries the read/write heads. The actuator is positioned in response to an address signal so that the heads become positioned along an addressed track of the magnetic disk.

When power is removed from the disk drive, it is desireable to move the actuator to a position which causes the heads to be removed from or positioned away from active data storing tracks on the disk. This removal of the heads being widely-known in the art as "parking" the heads. Once the heads are parked, it is desirable to latch the actuator in the parked position, thereby allowing the disk drive to be moved from one location to another or be able to withstand unintentional vibrations and shock.

To latch the actuator in the parked position, a solenoid may be provided for engaging the actuator. For example, in U.S. Pat. No. 4,807,072, a head positioner control mechanism with head-locking for magnetic disk drive is disclosed. The transducer head is locked by a locking lever which pivots in a plane parallel to the disk plane for movement in and out of locking engagement with a member jointly rotatable with the head arm. The solenoid holds the locking lever out of engagement with the rotary member during data transfer between the disk and head. Upon completion of data transfer or when power is removed from the disk drive, the solenoid becomes deenergized permitting the locking lever to be sprung into locking engagement with the jointly rotatable member of the head arm.

A disadvantage and limitation of the device disclosed in the above-mentioned patent is that during operation of the disk drive, an electrical current needs to be continuously applied to the locking solenoid to keep the locking lever retracted. This current generates heat in the solenoid windings which may cause failure of the solenoid. It is therefore highly desirable to provide a locking solenoid wherein the current could be removed from the solenoid, which would normally cause the locking lever to assume the locking position, yet maintain the locking lever retracted during active operation of the disk drive.

SUMMARY OF THE INVENTION

It is therefore an object of the present invention to provide an electro-mechanical latch wherein the latching member is removed from its latching position upon a current being applied to the electro-mechanical latch and wherein the latch remains removed from the latching position when the current is removed.

According to the present invention, an electro-mechanical latch includes a solenoid having a armature movable from a normally biased first position to a second position in response to an electrical current applied to the solenoid, and means for holding the armature in the second position to allow subsequent removal of the current from the solenoid. When the armature is in its first position, it is adapted for the latching device in a parked position. The armature is non-interactive with such device when in the second position. The electro-mechanical latch of the present invention further includes means for releasing the holding of the armature in response to the device returning to its parked position, whereby the armature returns to its normally biased first position to latch the device.

An important advantage and feature of the present invention is that the current need be applied to the solenoid only for moving the armature to release the device. The current may then be removed from the solenoid with the holding means holding the armature in a position which is non-interactive with the device.

Thus, there is no power dissipation in the solenoid which may cause failure as in the prior art. These and other objects, advantages and features of the present invention, will become readily apparent to those skilled in the art, from a study of the following description of an exemplary preferred embodiment of the present invention when read in conjunction with the attached drawings and appended claims.

DESCRIPTION OF AN EXEMPLARY PREFERRED EMBODIMENT

Figure 1:
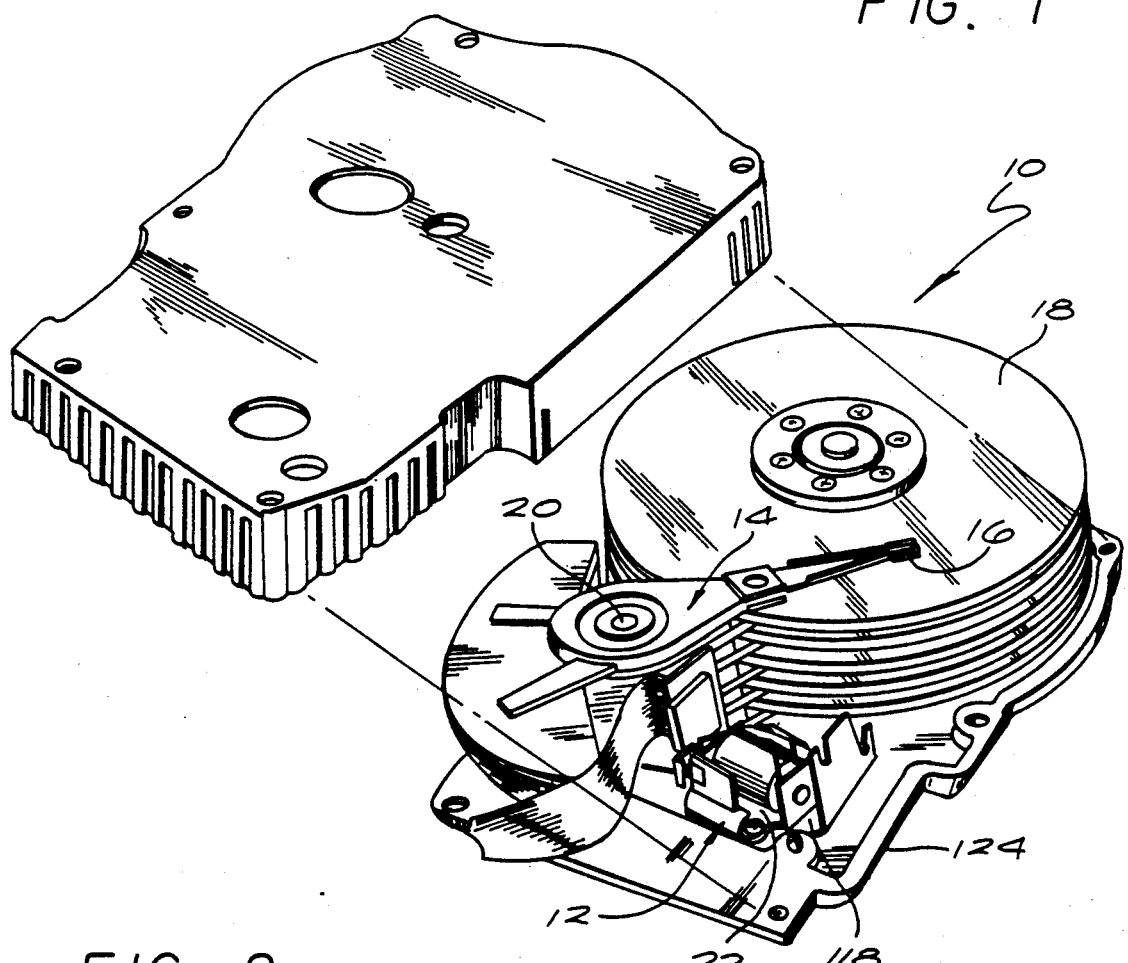
FIG. 1 is a partially exploded view of a disk drive incorporating a novel electro-mechanical latch constructed in accordance with the principles of the present invention.
Figure 2:
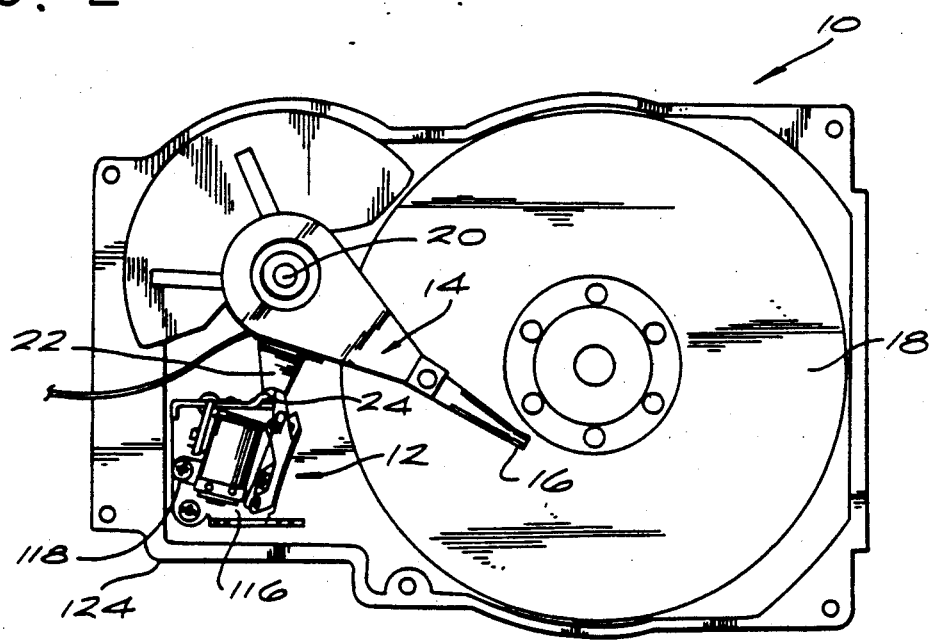
FIG. 2 is a plan view, of the disk drive of FIG. 1 with cover removed, showing the novel electro-mechanical latch.

Referring now to FIGS. 1 and 2, there is shown a Winchester-type disk drive 10, which incorporates an electro-mechanical latch 12 constructed in accordance with the principles of the present invention, which will be described in greater detail hereinbelow. The disk drive 10 is an exemplary environment in which the electro-mechanical latch 12 of the present invention may be used. In this environment, the device to be latched in the parked position is an actuator 14 of the disk drive 10.

As is well known, the actuator 14 carries the transducer heads 16 through which data transfers occur with various tracks and sectors thereof on the magnetic disk 18. The actuator 14 is rotatable about an axis 20 and positioned in response to address signals applied to the disk drive 10 for placing the transducer heads 16 over the address track of the disk 18. The actuator 14 includes a radially extending member 22 which is rotatable jointly with the actuator 14. At a distal end of the radially extending member 22, is an axially projecting member 24 (best seen in FIG. 3), to facilitate interaction with the electro-mechanical latch 12 of the present invention.

The environment hereinabove described is but one example of an intended use of the electro-mechanical latch 12 of the present invention. This environment is not intended to be a limitation upon the construction or use of the novel electro-mechanical latch 12 of the present invention which will be fully described immediately hereinbelow.

Figure 3:
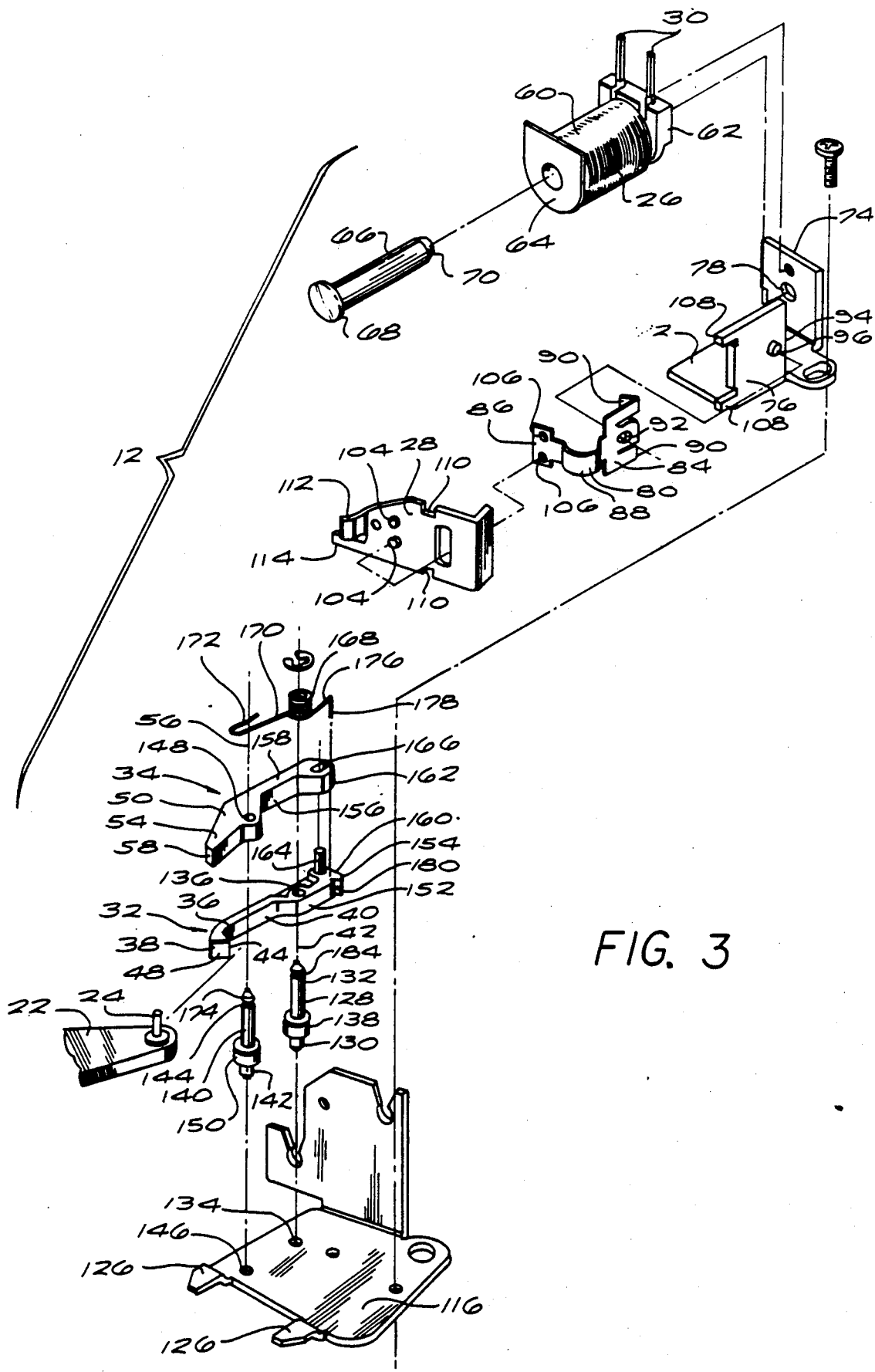
FIG. 3 is a exploded view of the novel electro-mechanical latch shown in FIGS. 1 and 2.
Figure 4:
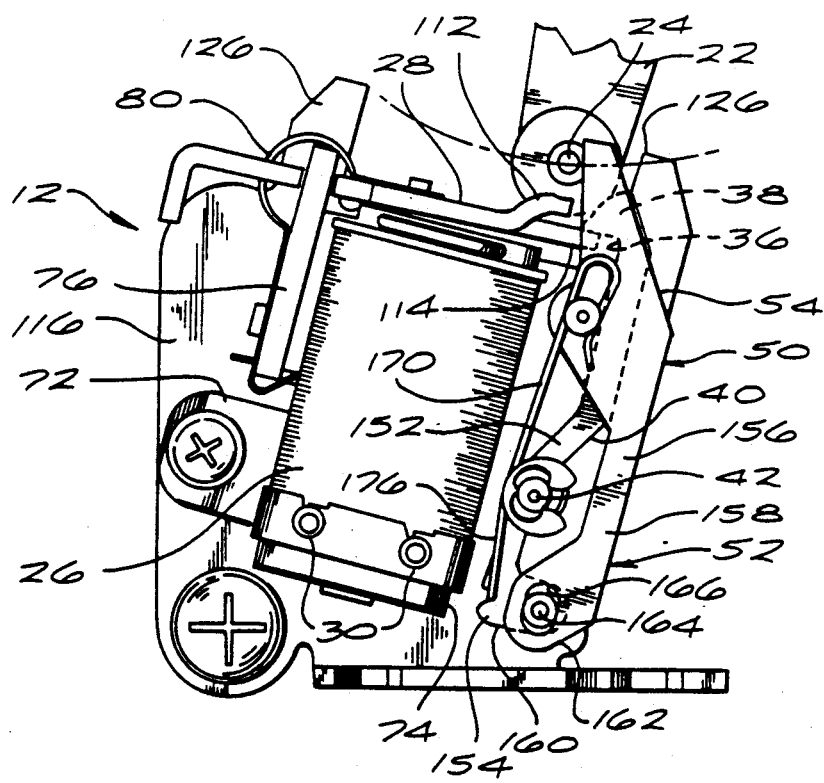
FIG. 4 illustrates one operating state of the electro-mechanical latch of FIG. 3.
Figure 5:
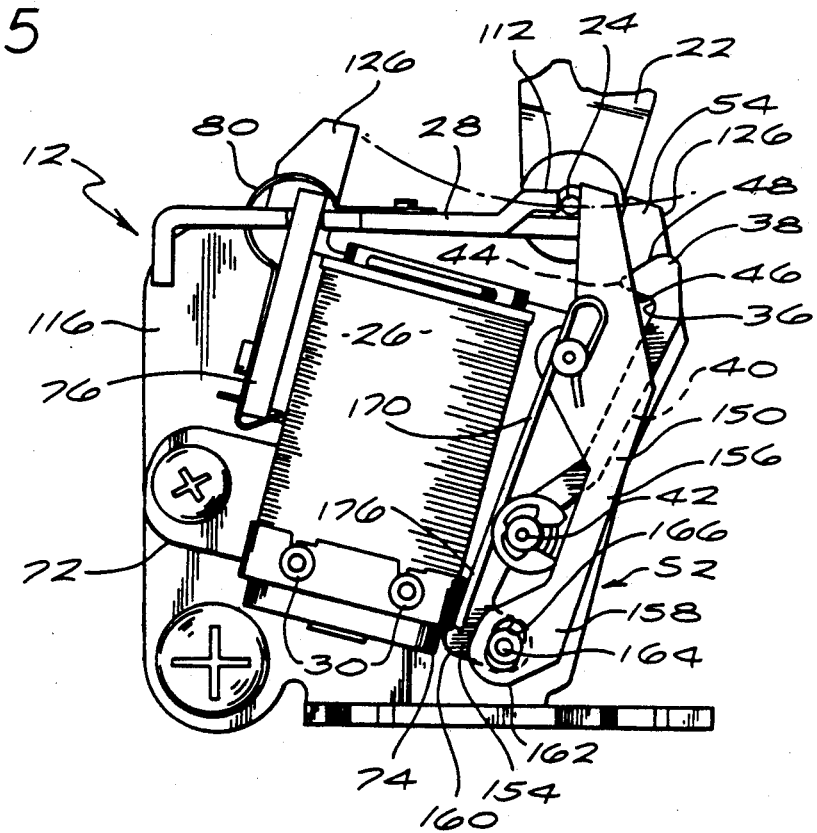
FIG. 5 illustrates another operating state of the electro-mechanical latch of FIG. 3.

Referring now further to FIGS. 3–5, the electromechanical latch 12 includes a solenoid 26 having an armature 28 movable from a normally biased first position, best seen in FIG. 5, to a second position, as best seen in FIG. 4, in response to an electrical current applied to the solenoid 26 at the electrical terminals 30. As best seen in FIG. 5, when the armature 28 is in its first position, it latches the device, herein the axially extending member 24 of the radial member 22 of the actuator 14 in a parked position. When the armature 28 in its second position, best seen in FIG. 4, it is non-interactive with the device, and, more particularly, the axially extending member 24.

In accordance with the present invention, the electromechanical latch 12 further includes means 32 for holding the armature 28 in the second position in response to the armature being moved to the second position upon application of the current to the terminals 30 of the solenoid 26. The holding means 32 allows for the subsequent removal of the current. The electro-mechanical latch 12 further includes means 34 for releasing holding of the armature 28 in response to the device, the axially extending member 24, returning to the parked position thereby the armature 28 returns to its normally biased first position to latch the device.

In one embodiment of the present invention, the holding means 32 includes a rotatably mounted hook 36 movable between a normally biased engaging position, best seen in FIG. 4, and a release position, best seen in FIG. 5. The hook 36 is adapted to engage the armature 28 when the armature is in its second position (FIG. 4). The releasing means 34 is further for rotating the hook 36 from the engaging position (FIG. 4) to the release position (FIG. 5).

The hook 36 includes an arm 40 radially extending from an axis 42 of rotation, the arm 40 having a distal end 38. The hook 36 further includes a snare 44 extending outwardly of the distal end 38 in a direction toward the engaging position. The snare 44 has a first face 46 extending outwardly of the arm 40 to engage matingly the armature 28 when the armature is in its second position (FIG. 4). The snare 44 further includes a second face 48 which forms a cam to allow the armature 28 to displace momentarily the hook 36 towards its release position as the armature 28 approaches its second position.

The releasing means 34 includes a rotatably mounted trigger movable between a normally biased set position (FIG. 4), and a triggering position (FIG. 5). The trigger 50 is dimensioned to occupy the parked position of the device, herein the axially projecting member 24 of the radially extending member 22 of the actuator 14, when the trigger 50 is in its set position. When the device, or axially extending member 24, enters the parked position it displaces the trigger 50 to move the trigger to its triggering position, best seen in FIG. 5.

The releasing means 34 further includes means 52 for rotating the hook 36 to its release position in response to the trigger 50 being moved to its triggering position to release the armature 28. When the armature 28 is released, it engages the axially extending member 24 of the radially extending member 22 of the actuator 14 to lock the actuator 14 in its parked position as best seen in FIG. 5.

The trigger 50 includes an arm 54 radially extending from an axis 56 of rotation. The arm 54 has a distal end 58 which occupies the parked position of the axially projecting member 24 when the trigger is in its normally biased set position. The holding means 32 is made non-operative in response to the trigger moving into its displaced position by the rotating means 52.

The solenoid 26 further includes a coil 60 electrically coupled to the terminals to develop a magnetic field upon application of the current to the solenoid 26, the coil 60 having, a first end 62 and a second end 64. The solenoid further includes a yoke 66 of magnetically conductive material extending coaxially through the coil 60 and has a flange 68 at one end thereof and a reduced diameter portion 70 at the other end thereof. The solenoid 26 also includes a base plate 72 of magnetically conductive material having a first upright wall 74 and a second upright wall 76.

The first end 62 of the coil 60 is in a facing relationship to the first upright wall 74. The first upright wall has a bore 78 dimension to receive the reduced diameter portion 70 of the yoke 66. The yoke 66 is disposed through the coil 60 so that the flange 68 engages the second end 64 of the coil 60. The reduced diameter portion 70 is received by the bore 78 to mount the coil 60 to the baseplate 72. The second upright wall 76 is perpendicular to the first upright wall 74 and is disposed in a spared relationship to the coil 60.

Completing the description of the solenoid 26, an armature spring 80 is mounted to the second upright wall 76 and is adapted to secure rotationally the armature 28 to a forward edge of 82 cf the second upright wall 76 so that the armature 28 is n a facing relationship to the second end 64 of the coil 60. More specifically, the armature spring 80 has a first mounting portion 84, a second mounting portion 86 and a generally U-shaped leaf spring portion 88 intermediate to the first mounting portion 84 and the second mounting portion 86. The first mounting portion 84 is secured to the second upright wall 76 in a facing relationship thereto by a pair of tangs 90 and an opening 92. The second upright wall 76 includes a rearward edge 94 and a mounting pin 96. The tangs 90 engage the rearward edge 94 with the mounting pin 96 being received by the opening 92.

The armature 28 has a front face 98, a rear face 100 and an aperture 102 extending therethrough. The rear face 100 is in a facing relationship to the second end 64 of the coil 60. The leaf spring portion 88 of the armature spring 80 is disposed through the aperture 102. The second mounting portion 86 of the armature spring 80 is secured to the front face 98 of the armature 28. The front face 98 of the armature 28 has a pair of mounting pins 104 extending outwardly therefrom. The second mounting portion 86 has a pair of openings 106 wherein each of the openings receives its corresponding one of the mounting pins 104 to mount the second mounting portion 86 to the front face 98 of the armature 28. The forward edge 82 of the second upright wall 76 has a pair of outwardly extending posts 108. The armature 28 has a pair of notches 110, wherein each of the notches 110 are dimensioned to receive a corresponding one of the posts 108. The armature spring 80 holds the armature 28 against the forward edge 82 of the second upright wall 74 with the post 108 engaging the armature 28 through the notches 110 such that the armature rotates against the forward edge 82. The armature 28 also has a first tang 112 and a second tang 114. The first tang 112 is adapted to engage the axially extending member 24 of the radially extending member 22. The second tang 114 is adapted to be engaged by the hook 36.

The electro-mechanical latch 12 of the present invention also includes a mounting plate to which the base plate 72 is secured by a threaded fastener 118. The threaded fastener 118 is received through a bore 120 in a bottom wall 122 of the mounting plate 116, but is not secured thereto. The threaded fastener 118 secures to a chassis 124 of the disk drive 10. Therefore, the base plate 72 can be adjusted with respect to the mounting plate 116 independently of the chassis 124 so that the armature 28 may be aligned with the axially projecting member 24 independently of the hook 36 and trigger 50. The mounting plate also has a pair of prongs 126 extending outwardly and positioned for providing crash-stop limits on the rotational movement of the radially extending member 22 of the actuator 14.

The holding means 32 further includes a pin 128 disposed along the axis of rotation 42. The pin 128 has a first end 130 and a second end 132. The first end 130 of the pin 128 is mounted in an aperture 134 of the mounting plate 116. The hook 36 has a bore 136 there through for receiving the second end 132 of the pin 128 to mount the hook 36 in rotatable engagement to the pin 28. The pin 128 also includes a radially extending flange 138 to support the hook 36.

Similarly, the releasing means 34 includes a pin 140 disposed along the axis of rotation 56. The pin 140 has a first end 142 and a second end 144. The first end 142 of the pin 140 is mounted in an aperture 146 in the mounting plate 116. The trigger 50 has a bore 148 there through. The second end 144 of the pin 140 is received in the bore 148 to mount the trigger in rotatable engagement to the pin 140. The pin 140 also includes a radially extending flange 150 for supporting the trigger 50.

Above-described is one exemplary embodiment of the present invention. Additional features of the present invention are described in detail hereinbelow.

The hook 36 may be formed from a first lever 152 which is rotatable between the normally biased engaging position and the release position about the axis of rotation 42. The first lever 15L includes the first arm 40 and the distal end 38 of the hook 36 as hereinabove described. Furthermore, the first lever 152 includes a second arm 154 extending radially from the axis 42.

The trigger 50 may be formed from a second lever 156 rotatable between the set position and the triggering position about the second axis of rotation 56. The second lever 156 includes the first arm 54 of the trigger 50. Furthermore, the lever 156 includes a second arm 158 extending radially from the axis 56. The second arm 154 of the first lever 152 has a distal end 160 and the second arm 158 of the second lever 156 has a distal end 162. The distal end 160 is operatively coupled to the distal end 162 such that the first lever 152 is moved to the release position in response to the second lever 156 being moved into the triggering position whereby the armature 28 returns to its second position to latch the device, or actually projecting member 24.

To couple the distal end 160 of the second arm 154 of the first lever 152 to the distal end 162 of the second arm 158 of the second lever 156, the distal end 160 of the second arm 154 of the first lever 152 has a pin 164 extending upwardly therefrom, whereas the distal end 162 of the second arm 158 of the second lever 156 has an elongated aperture there through. The pin 164 is received in slidable engagement with the elongated aperture 166 such that rotation of one of the first lever 152 and the second lever 156 imparts rotation to the other of the first lever 152 and the second lever 156.

The first axis 42 and the second axis 56 are substantially parallel to each other with the first lever 152 and the second lever 156 being in a stacked relationship to each other. Moreover, the first lever 152 and the second lever 156 counter-rotate with respect to each other. An advantage of the counter-rotation is that the first lever 152 and the second lever 156 may be dimensioned such that their angular momentum to the one lever substantially cancels the angular momentum of the other lever. The cancellation of the angular momentum to reduce vibration which may occur in the operation of the electro-mechanical latch 12.

To insure that the cancellation of angular momentum has occurred, a first ratio of the radial length of the first arm 40 of the first lever 152 to the radial length of the second arm 154 of the first lever 152 is substantially equal to a ratio of the radial length of the second arm 158 of the second lever 156 to the radial length of the first arm 54 of the second lever 156.

To mount the first lever 152 and the second lever 156 to the pins 128, 140 and to bias the first lever 152 in its normally biased position, the electro-mechanical latch 12 further includes a coil spring 168 coaxially disposed with the axis of rotation 42, or coaxially with pin 128, above the first lever 152. The spring 168 has a first arm 170 with a hook 172 at its distal end which engages a channel 174 in the second end portion 144 of the pin 140 projecting through the bore 148 above the second lever 156. The spring 168 also includes a second arm 176 which has a bent portion 178 at its distal end. The bent portion 178 is received by a channel 180 formed in the distal end 160 of the second arm 154 of the first lever 152. To secure the spring 168 to the pin 128, an E-clamp 182 is disposed over the top of the spring 168 and secured to a channel 184 in the second end portion 132 of the pin 128.

There has been hereinabove described particular embodiments of an electro-mechanical latch constructed according to the principles of the present invention. Those skilled in the art may now make numerous uses of and modifications to the above-described embodiments without departing from the inventive concepts disclosed herein. Accordingly, the present invention is to be defined solely by the scope of the following claims.

I claim:

1. An electro-mechanical latch comprising:
    a solenoid including an armature movable from a normally biased first position to a second position in response to an electrical current applied to said solenoid, said armature when in said first position being adapted to latch a device in a parked position, said armature when in said second position, being non-interactive with said device;
    means for holding said armature in said second position in response to said armature being moved to said second position upon application of said current to allow subsequent removal of said current; and
    means for releasing holding of said armature in response to said device returning to said parked position whereby said armature returns to sad normally biased first position to latch said device.

2. A latch as set forth in claim 1 wherein said holding means includes a rotatably mounted hook movable between a normally biased engaging position and a release position, said hook being adapted to engage said armature when said armature is in said second position, said releasing means being further for rotating said hook from said engaging position to said release position.

3. A latch is set forth in claim 2 wherein said holding means further includes a spring arranged to bias said hook in said engaging position.

4. A latch is set forth in claim 2 wherein said hook includes:
 an arm radially extending from an axis of rotation, said arm having a distal end; and
 a snare extending outwardly of said distal end in a direction toward said engaging position, such snare having a first face extending outwardly of said arm to engage matingly said armature when said armature is in such second position.

5. A latch such as set forth in claim 1 wherein said releasing means includes the rotatably mounted trigger movable between a normally biased set position and a displaced position, said trigger being dimensioned to occupy said parked position of said device when said trigger is in such set position, said device upon entering said parked position, displacing said trigger to move said trigger to said triggering position, said holding means being made non-operative in response to said trigger moving into said displaced position.

6. In a disk drive having a rotatably mounted actuator, an electro-mechanical latch for latching said actuator in a parked position and for allowing rotational displacement of said actuator during read/write access of said disk drive, said actuator being adapted to be engaged by said electro-mechanical latch, said latch comprising:
 a solenoid including an armature movable from a normally biased first position to a second position in response to an electrical current applied to said solenoid, said armature when in said first position being adapted to engage said actuator to hold said actuator in a parked position, said armature when in such second position being non-interactive with said actuator;
 means for holding said armature in said second position a response to said armature being moved to said second position upon application of such current to allow subsequent removal of said current; and
 means for releasing holding of said armature in response to said actuator returning to said parked position whereby said armature returns to said normally biased first position to latch said actuator.

7. A latch as set forth in claim 6 wherein said solenoid includes a mounting plate having a pair of prongs extending outwardly therefrom, said prongs being positioned for providing limits on rotational movement of said arm by engagement with said actuator.

8. A latch is set forth in claim 6 wherein said holding means includes a rotatably mounted hook movable between a normally biased engaging position and a release position, said hook being adapted to engage said armature when said armature is in said second position, releasing means being further for said rotating of said hook from said engaging position to said release position.

9. A latch as set forth in claim 8 wherein said hook includes:
 an arm radially extending from an axis of rotation, said arm having a distal end; and
 a snare extending outwardly of said distal end in a direction toward said engaging position, such snare having a first face extending outwardly of said arm to engage matingly to said armature when said armature is in said second position.

10. A latch as set forth in claim 9 wherein said snare further includes a second face at an angle to said first face, said second face forming a cam to allow said armature to displace momentarily said hook toward said release position as said armature approaches said second position.

11. A latch as set forth in claim 9 wherein said holding means further includes a pin disposed along said axis of rotation, said pin having a first end and a second end, said solenoid having a mounting plate, said mounting plate having an aperture, said first end of said pin being mounted in said aperture, said hook having a bore therethrough, said second end of said pin being received in said bore to mount said hook in rotatable engagement to said pin.

12. A latch as set forth in claim 1 wherein said pin further includes a radially extending flange, said flange supporting said hook.

13. A latch as set forth in claim 8 wherein said releasing means includes:
 a rotatably mounted trigger moveable between a normally biased set position and a triggering position, said trigger being dimensioned to occupy said parked position of said actuator when said trigger is in said set position, said actuator upon entering said parked position displacing said trigger to move said trigger to said triggering position, and
 means for rotating said hook to said release position in response to said trigger being moved to said triggering position to release said armature whereby said armature engages said actuator to latch said actuator in said park position.

14. A latch as set forth in claim 13 wherein said trigger includes an arm radially extending from an axis of rotation, said arm having a distal end occupying said parked position.

15. A latch as set forth in claim 14 wherein said releasing means further includes a pin disposed along said axis of rotation, said pin having a first end and a second end, said solenoid having a mounting plate, said mounting plate having an aperture, said first end of said pin being mounted in said aperture, said trigger having a bore there through, said second end of said pin being received in said bore to mount said trigger in rotatable engagement to said pin.

16. A latch as set forth in claim 15 wherein said pin further includes a radially extending flange, said flange supporting said trigger.

17. A latch as set forth in claim 13 wherein said solenoid further includes:
 a coil adapted for application of said current and having a first end and a second end;
 a yoke of magnetically conductive material extending coaxially through said coil and having a flange at one end thereof and a reduced diameter portion at the other end thereof;
 a base plate of magnetically conductive material having a first upright wall and a second upright wall, said first end of said coil being in a facing relationship to said first upright wall, said first upright wall having a bore dimensioned to receive said reduced diameter portion, said yoke being disposed through said coil, said flange engaging the second end of said coil, said reduced diameter portion received by said bore to mount said coil to said first upright wall of said base plate, said second upright wall being perpendicular to said first upright wall and disposed in a spaced relationship to said coil, said second wall having a forward edge; and an armature spring mounted to said second upright wall and adapted to rotatably secure said armature to said forward edge of said second upright wall, said armature being in a facing relationship to said second end of said coil.

18. A latch as set forth in claim 17 wherein said spring has a first mounting portion, a second mounting portion and a generally u-shaped leaf spring portion intermediate said first mounting portion and said second mounting portion, said first mounting portion being secured to said second upright wall in a facing relationship thereto.

19. A latch as set forth in claim 18 wherein said first mounting portion includes a pair of tangs and an opening, said second wall having a rearward edge and a mounting pin, said tangs engaging said rearward edge, said mounting pin being received by said opening.

20. A latch as set forth in claim 18 wherein said armature has a front face, a rear face and an aperture extending therethrough, said rear face being in a facing relationship to said second end of said coil, said leaf spring portion being disposed through said aperture, said second mounting being secured to said front face.

21. A latch as set forth in claim 20 wherein said front face has a pair of mounting pins extending outwardly therefrom, said second mounting portion having a pair of openings, each of said openings receiving a corresponding one of said pins to mount said second mounting portion to said front face.

22. A latch as set forth in claim 17 wherein such forward edge has a pair of outwardly extending posts, said armature having a pair of notches, each of said notches being dimensioned to receive said posts, said spring holding said armature against said forward edge, said post further engaging said armature.

23. A latch as set forth in claim 17 wherein said armature has a first tang and a second tang, said first tang being adapted to engage said actuator such second tang being adapted to be engaged by said hook.

24. An electro-mechanical latch comprising:

a solenoid, including an armature movable from a normally biased first position to a second position in response to an electrical current applied to said solenoid, said armature when in said first position being adapted to latch device in a parked position, said armature when in second position being non-interactive with said device;

a first lever rotatable between a normally biased engaging position and a release position about a first axis of rotation, said first lever having a first arm extending radially from said axis and a second arm extending radially from said axis, said first arm having a distal end adapted to engage said armature when said armature is moved into said second position in response to said current to allow subsequent removal of said current; and a second lever rotatable between a set position and a triggering position about a second axis of rotation, said second lever having a first arm extending radially from said second axis and a second arm extending radially from said second axis, said first arm of said second lever having a distal end and occupying said parked position, said device upon entering said parked position displacing said distal end of said first arm of said second lever to move said second lever into said triggering position, said second arm of said first lever and said second arm of said second lever each having a distal end operatively coupled to each other such that such first lever is moved to said release position in response to said second lever being moved into said triggering position whereby said armature returns to said second position to latch said device.

25. A latch as set forth in claim 24 wherein said distal end of said second arm of said second lever has an elongated aperture extending there through, said second arm of said firs-. lever having a pin, said pin being mounted in slidable engagement within said elongated aperture such that rotation of one of said first lever and said second lever imparts rotation to one other of said first lever and said second lever.

26. A latch as set forth in claim 25 wherein said first axis and said second axis are substantially parallel to each other.

27. A latch as set forth in claim 26 wherein said first lever and said second lever are generally disposed in a stacked relationship to each other.

28. A latch as set forth in claim 26 wherein said first lever and said second lever and said second lever counter-rotate with respect to each other.

29. A latch as set forth in claim 28 wherein said first lever and said second lever are dimensioned such that the angular momentum of said first lever substantially cancels the angular momentum of said second lever.

30. A latch as set forth in claim 26 wherein a first ratio of radial length of said first arm of said first lever to radial length of said second arm of said first lever is substantially equal to a ratio of radial length of said second arm of said second lever to radial length of said first arm of said second lever.

* * * * *